May 14, 1957 A. C. MASON 2,791,936
PHOTOGRAPHIC APPARATUS
Filed July 19, 1954
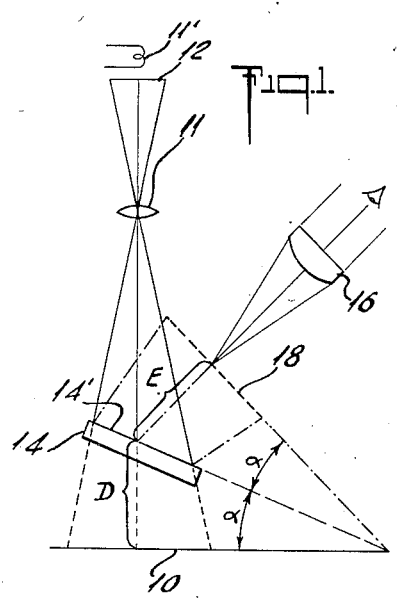
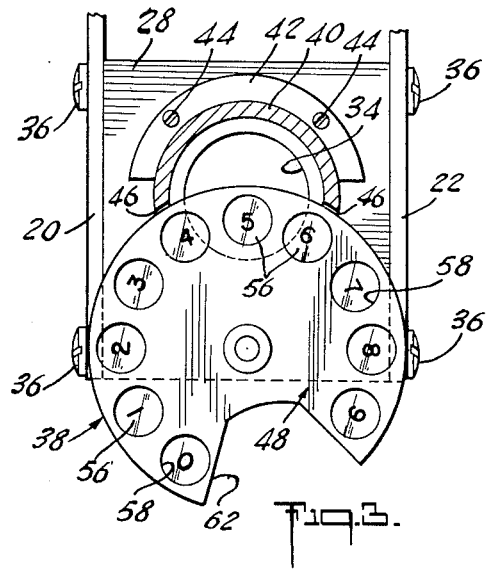
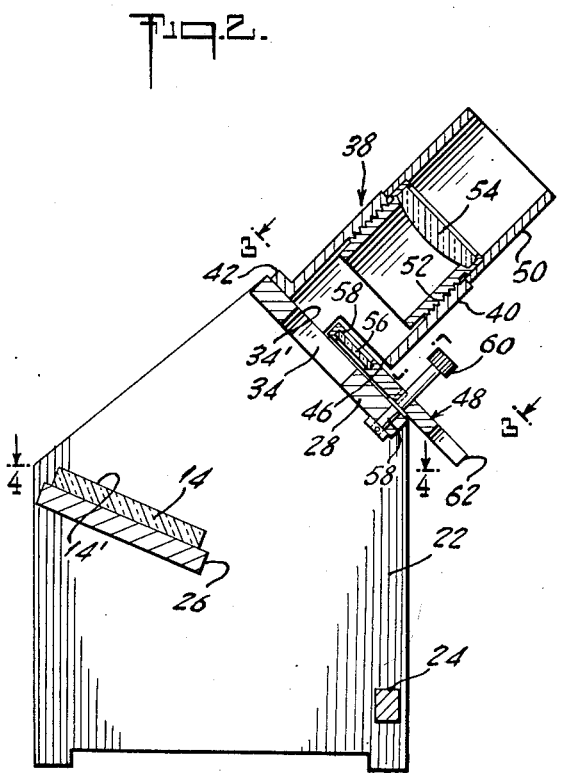
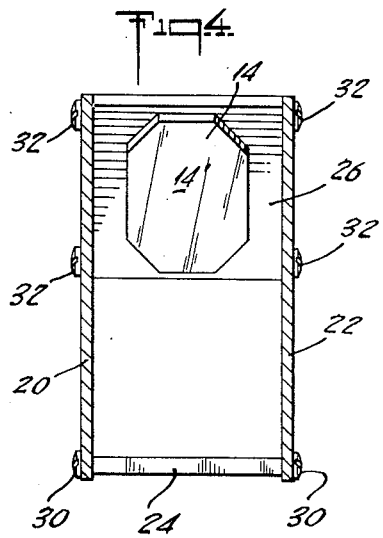
INVENTOR
ALBERT C. MASON
ATTORNEY United States Patent Office 2,791,936
Patented May 14, 1957

2,791,936
PHOTOGRAPHIC APPARATUS
Albert C. Mason, Larchmont, N. Y.
Application July 19, 1954, Serial No. 444,155
1 Claim. (Cl. 88—24)

This invention relates to photographic equipment and more specifically to improved magnifying apparatus to facilitate the focusing of photographic enlarging apparatus to insure the attainment of sharply focused enlargements notwithstanding the density of the picture negative being enlarged nor the quantity of ambient light about the easel.

In the enlargement of photographs it is customary to provide projection apparatus including a light source, enlarging lens, a holder for the negative to be enlarged between the light source and the lens, and an easel upon which the photograph is projected. When the image is properly focused on the easel and of the desired size, a sheet of light sensitive paper is placed on the easel and exposed to the image projected by the enlarging lens. This procedure while normally satisfactory for medium or low density negatives which enable the image on the easel to be readily observed by the eye is not at all satisfactory for highly dense negatives which make visual observation exceedingly difficult and particularly in the case of unsharp negatives.

Devices have been proposed for overcoming this difficulty and providing an aid in the form of magnifying lenses and ground glass screens which are arranged to intercept a portion of the light from the enlarging apparatus and thus enable the operator to focus the enlarger more precisely. While such a procedure enables the attainment of some improvement in focusing, it has been found to fall short of the ideal, not only with very dense negatives but even with negatives of normal density, especially in cases where ambient light conditions while not affecting the light sensitive photographic paper is sufficient to override the image formed on the ground glass screen to an extent that accurate focusing cannot be attained. Accordingly, it is one object of this invention to provide a highly improved device for accurately focusing enlargers even in instances where abnormally high ambient illuminations are encountered and notwithstanding the density of the negative being enlarged provided, however, that sufficient light can be projected through the negative to expose sensitized paper on which the enlargement is to be made.

Another object of the invention is an improved focusing magnifier characterized by its simplicity and ruggedness and which is readily adapted for use with conventional enlarging apparatus to enable the attainment of precise focusing of the image on the easel.

A further object of the invention resides in the provision of an improved focusing magnifier and cooperating exposure measuring means wherein the exposure time for a given negative can be determined simultaneously with the focusing of the enlarger.

The above and other objects of the invention will become more apparent from the following description and drawings forming part of this application.

In the drawings:

Fig. 1 is a diagrammatic view illustrating the relationship of the certain elements of the invention;

Fig. 2 is a cross-sectional view of one embodiment of the invention;

Fig. 3 is a cross-sectional view of Fig. 2 taken along the line 3—3 thereof; and Fig. 4 is a cross-sectional view of Fig. 2 taken along the line 4—4 thereof.

Broadly, the apparatus in accordance with the invention provides means for the formation and observation of a real image of the negative or other image source being enlarged while at the same time avoiding substantial losses in light occasioned by the interposition of optical elements normally employed for purposes of this character and which result in a material reduction of available light necessary to attain precision focusing. Moreover, the image being focused with the aid of apparatus in accordance with this invention is actually disposed relative to the enlarging apparatus so that final focusing may be accomplished while the image is being observed and does not necessitate further compensation or modification of the adjustment upon removal of the focusing device.

A conventional enlarger is diagrammatically illustrated in Fig. 1 and includes an easel 10 and an enlarging lens 11. The negative 12 being enlarged is disposed above the enlarging lens 11 and a light source 11', of any suitable character, is normally disposed above the negative. With this arrangement light from the light source 11' passes through the negative 12 and enlarging lens 11 to form an image on the easel 10.

In accordance with the invention a first surface mirror 14 is disposed in the beam of light projected by the lens 11 and intercepts at least part thereof. The face of the mirror is disposed at an angle α relative to the easel 10 to reflect that portion of the light intercepted in a direction inclined upwardly and outwardly of the easel 10.

The distance D of the reflecting surface of the mirror from the easel 10 may be of any value that will enable the operator to conveniently observe the image produced thereby through an eye piece 16. The real image 18 denoted by a dotted line lies in a plane disposed approximately at an angle α from the reflecting surface 14' of the mirror 14. This image 18 is a real image in space and the total distance from the lens 11 to the image 18 is identical to the distance from the lens 11 to the easel 10. The eye piece 16, which may be formed in any suitable manner, is positioned in line with the real image 18 and adjusted so that its focal plane is coincident of the plane of the image 18. In this way the real image formed in space is directly observed through the eye piece and thus effective utilization is made of all of the available light for inspection and focusing of the enlarger.

In actual practice it has been found that an eye piece 16 having a focal length of about one inch which provides sufficient magnification so that focusing can be accomplished if necessary by observation of the grain structure of the negative. In addition this system also renders the rays being observed parallel so that the eye can refocus them without difficulty. In effect therefore the eye is placed below the easel a distance equal to the distance D and looks directly at the enlarger lens and the negative image formed by it, thus providing unparalleled brilliance. These advantages are obtainable whether it is used in a conventional dark room or in the presence of normal ambient light.

One embodiment of the invention is shown in Figs. 2 to 4 which also illustrate the coordination of exposure indicating means with the focusing magnifier. More specifically, the magnifier comprises a frame having a pair of side members 20 and 22 disposed parallel one to the other and coupled by three transverse members 24, 26 and 28. The transverse member 24 is a rectangular bar secured in position between the frame members 20 and 22 by a pair of screws 30 which extend through the frame members and are threaded into the ends of the bar 24. The transverse member 26 is in the form of a plate and is secured to the side members 20 and 22 by four screws 32 in the same manner as in the case of the bar 24. The plate 26 preferably carries the first surface mirror 14 which may be cemented or otherwise secured thereto. It is disposed at an angle relative to the plane of the bottom edge of the side members 20 and 22 so as to form an angle relative to the easel as described in connection with Fig. 1. In this way vertical light striking the mirror 14 will be reflected through an opening 34 in the plate member 28. The plate 28 is inclined relative to the bottom edges of the frame members 20 and 22 at an angle of $2\alpha$ and is secured in position by means of four screws 36. In addition to the angular correlation of the mirror 14 with the front surface 34' of the plate 34 these elements are also positioned relative to each other and to the side members 20 and 22 so that the real image formed by the mirror 14 is exactly coincident with the front surface 34' of the transverse member 28.

The eye piece, which is broadly denoted by the numeral 38, comprises a cylindrical base member 40 having a partial flange 42 for securing it to the face 34' of the member 28 by a pair of screws 44. This member is also generally centered relative to the opening 34 as shown in Fig. 2 and is provided with a slotted portion 46 for reception of an exposure wheel 48 to be described. Extending outwardly from the cylindrical member 40 of the eye piece 38 is a second cylindrical member 50 having a threaded end portion 52 for engaging corresponding threads on the internal surface of the cylindrical member 40 so that the member 50 can be moved inwardly and outwardly of the member 40 by rotating it in one direction or the other. Within the cylindrical member 50 is a lens 54 suitably secured in position therein and having a focal length of such dimensions that the focal plane of the lens can be moved into coincidence with the plane of the real image formed at the surface 34' of the transverse member 28.

In the operation of this focusing magnifier the entire assembly is placed immediately on top of the easel and preferably spaced from the easel a distance corresponding to the thickness of the photographic paper on which the image is to be projected and in a manner so that the mirror 14 reflects at least part of the light from the lens 11. In order to insure proper adjustment of the eye piece 38 a piece of paper or other object is positioned on the surface 34' by sliding it beneath the wheel 48 and the eye piece is then adjusted to focus directly on that object and may be locked in the adjusted position by any suitable means. The paper or other object is then removed and the real image may be viewed directly through the eye piece. Focusing of the image is then accomplished by adjustment of the lens 11 and the entire head of the enlarger to produce a precisely focused image of the desired size on the easel 10.

In making photographic enlargements it is also necessary to determine in some way the time during which the sensitized paper must be exposed in order to obtain a satisfactory reproduction. It has been found that considerable advantage can be gained in this direction by the use of the exposure wheel 48 in connection with the focusing magnifier discussed above. The wheel 48 may be of any desired construction carrying a plurality of different density exposure measuring elements 56. In the illustrated embodiment these elements are circular in shape and are secured within suitable openings 58 disposed about the periphery of the wheel 48. For present purposes these elements are denoted in Fig. 3 by the numerals 0–9 inclusive and may be calibrated in terms of time for a light source of a given brilliance. The density of these elements varies one relative to the other so that by observing the element which more nearly approximates the density of the negative a very close estimate of the desired exposure time can be obtained.

While the present embodiment of the invention illustrates an exposure wheel having separate elements 56 set therein, it may be fabricated of transparent material and carry painted areas of varying density in place of the separately inserted elements 56. The wheel 48 is pivoted to the plate 38 by a central shaft 58 which extends beyond the face of the wheel 48 and is provided with a knurled knob 60 to facilitate its rotation. In addition the wheel 48 is preferably provided with a recessed portion 62 which when disposed within the area of the eye piece 38 will enable the entire image formed in the opening 34 to be observed without interference from the wheel 48.

The invention as described above constitutes a simplified and effective apparatus for obtaining precise focusing of a negative either through observation of the image itself or failing that, through observation of the grain structure of the negative since the latter can be readily observed with this apparatus and constitutes the most effective means for focusing the image. Since both the image as well as the grain structure can be examined under highly magnified conditions, the resultant focus is very much sharper than that obtainable with prior known devices. As a result the sharpness of the finished enlargement will greatly exceed the capabilities of the human eye in detecting deficiencies by reason of improper adjustment or focusing of the enlarging apparatus.

In the illustrated embodiment of the invention, reflecting means in the form of a first surface mirror has been used in order to attain maximum light reflection. Because the reflecting surface of the mirror is unprotected it may be desirable to provide a removable protective cover to prevent accumulation of dust and mechanical damage when the device is not in use.

While only one embodiment of the invention has been shown and described, it is apparent that many changes, alterations and modifications may be made without departing from the true scope and spirit thereof.

What is claimed is:

Focusing apparatus comprising a frame having a pair of parallel side members with the bottom surface of said frame defining a plane substantially perpendicular to the planes of said side members, a reflector disposed between said members at a predetermined angle relative to said perpendicular plane, an eyepiece carried by the frame with the focal plane thereof spaced from said reflector a distance substantially equal to the distance between said reflector and said perpendicular plane and disposed at an angle relative to said reflector substantially equal to the angle between said reflector and said perpendicular plane, a circular disc carried by said frame and rotatable in the plane of the focal plane of said eyepiece and a plurality of light transmitting means disposed about the periphery of said disc, each having a different density whereby an optical image at least partially intercepted by said reflector can be accurately focused in said perpendicular plane by visually observing that portion of the real image formed in the focal plane of said eyepiece and the density of said image can be measured by comparison with the variable density means carried by said rotatable disc.

References Cited in the file of this patent

UNITED STATES PATENTS

| | | |
|---|---|---|
| 1,085,048 | Hunkill | Jan. 20, 1914 |
| 1,226,537 | Kumauchi | May 15, 1917 |
| 1,420,096 | Hauge | June 20, 1922 |
| 1,614,672 | Herz | Jan. 18, 1927 |
| 1,629,974 | Russo | May 24, 1927 |
| 1,870,464 | Ramsey | Aug. 9, 1932 |
| 1,994,102 | Holt | Mar. 12, 1935 |
| 2,053,317 | Billings | Sept. 8, 1936 |
| 2,082,170 | McRae | June 1, 1937 |
| 2,110,324 | Castle | Mar. 8, 1938 |
| 2,501,446 | Justice | Mar. 21, 1950 |

FOREIGN PATENTS

| | | |
|---|---|---|
| 387,544 | Great Britain | Feb. 9, 1933 |
| 143,004 | Austria | Oct. 10, 1935 |
| 180,709 | Switzerland | Jan. 16, 1936 |
| 809,547 | France | Dec. 12, 1936 |